Patented Feb. 22, 1949

2,462,054

UNITED STATES PATENT OFFICE 2,462,054

FURFURYL ALCOHOL-RESORCINOL RESIN COMPOSITION

John Delmonte, Glendale, Calif., assignor, by direct and mesne assignments, of seventy-two per cent to Ralph Hemphill, Los Angeles, Calif.

No Drawing. Application June 30, 1944, Serial No. 543,044

5 Claims. (Cl. 260—42)

This invention relates to resinous products, and in particular to resorcinol-containing resins condensed or polymerized under alkaline conditions with furane derivatives such as furfuraldehyde and furfuryl alcohol.

Furfuryl alcohol, alone or with furfural, in the presence of acids as catalysts, is known to form resinous bodies by condensation and polymerization. I have found that liquid resinous bodies may be produced in the presence of alkaline catalysts by the interaction of resorcinol with furfuryl alcohol as well as with furfural. I have also discovered that the liquid resinous materials thus formed between furfuryl alcohol and resorcinol, or between furfural and resorcinol, may advantageously be used as an addition material to the furane resin described in my co-pending application Serial No. 518,403, filed January 15, 1944, now abandoned, which consists of mixtures of furfuryl alcohol and furfural polymerized and condensed in the presence of acid catalysts. The addition of either resorcinol-furfuryl alcohol or resorcinol-furfural to my acid catalyzed furane resin effects a combination which may be catalyzed and resinified under alkaline conditions. Heretofore, the resinification of furfural-furfuryl alcohol resins has been possible only under acid conditions, and there are advantages resulting from the use of an alkaline catalyst instead of an acid one. The alkali catalyzed resinification of resorcinol with furfuryl alcohol appears to be specific to resorcinol as I have found that resins are not formed when phenol, or naphthol are substituted for the resorcinol in my mixtures.

Illustrative of my new furfuryl-alcohol-resorcinol liquid resins, I have brought together equal molar weights of furfuryl alcohol and of resorcinol, with from one to three parts per hundred of sodium carbonate, and heated the mixed liquids, with a reflux condenser arrangement to avoid loss of volatile materials, until a thick liquid resin is obtained. The viscosity of a given mixture of ingredients depends upon the time of heating. For example, using the indicated equal mole weight proportions and heating at 250 to 300° F. for one to two hours, a liquid of more than 300 centipoises is produced. Further additions of alkaline catalyst will effect further resinification, although even prolonged heating gives only a thermoplastic liquid polymer. To this liquid polymer may be added, preferably in equal molar proportions, furfural, and further resinification results. The addition of furfural to the liquid resorcinol-furfuryl alcohol resin imparts thermosetting qualities. An alkaline catalyst is used, and the reaction is exothermic. The product may be advantageously used for laminating and impregnating fabrics and the like.

I may vary the proportions of resorcinol and furfuryl alcohol over a fairly wide range, for example from 1:2 to 3:1 mole weights of the ingredients, with some variations in the properties of the liquid resins, the increase in proportion of the alcohol giving resins of lesser viscosity under otherwise similar conditions of polymerization. I prefer approximately equal numbers of moles of the two ingredients. The amount of alkaline catalyst may also be varied, and I may use sodium or potassium carbonate, or hydroxide, or other alkaline reagents, it being required that the mixture be alkaline to at least pH 8.0.

The liquid resins so produced are quite stable but may be converted over to solid, infusible, insoluble resins by the addition of an acid in sufficient quantity to change the condition to acidic. The exact nature of the polymerization reaction under alkaline conditions is not fully understood, but it has been observed that water is not given off as a product of the reaction, perhaps indicating that it is not an ordinary condensing reaction or polymerization, involving a carbon to carbon linkage through the furane ring.

In forming my resins with resorcinol I have found that a pure C. P. grade of resorcinol is not necessary, and small percentages of other ingredients such as catechol and phenolics may be present.

I have found the reaction of resorcinol with furfural to be much more vigorous than with furfuryl alcohol. It is advantageous to employ mildly alkaline conditions. When heating the preferred equi-molecular proportions of furfural and resorcinol, the reaction may advantageously be carried out in an open vessel because it is quite vigorous even below the boiling points of the constituents, and cooling may be required to control the reaction. Small additions of acetic acid may be used to inhibit the reaction. A thick liquid resin is obtained with a viscosity above 1000 centipoises. This liquid resin added to furfural-furfuryl alcohol acid-catalyzed resins will effect a combination which may be catalyzed by alkali catalysts. The products of this reaction are distinguished by good adhesive properties for aluminum and its ability to develop high strength at low temperatures, under 130° F. Low pressure curing resins for casting, and low pressure liquid resins for laminating have been prepared from these materials.

I have also made liquid resorcinol-furfural resins in the proportions of one mole of resorcinol to two moles of furfural, although these are not as satisfactory as the mixture with equi-molecular proportions. The liquid resorcinol-furfural resin thickens and solidifies at room temperature in a few days unless blended with the liquid furfural-furfuryl alcohol resins inhibited by means of volatile amines and the like. On the other hand I may arrest resinification of the resorcinol-furfural resin by dissolving it in an alcohol or acetone solvent. As such it exhibits excellent properties as a laminating varnish for impregnating cloth or paper for hot pressing.

I may substitute acid catalyzed furfuryl alcohol-formaldehyde resins for the acid catalyzed furfural-furfuryl alcohol resins in the combinations with the liquid furane-resorcinol resins above described, to produce mixtures which may be further catalyzed to solid resins in the presence of alkali catalysts.

One important use for the liquid resorcinol-furfuryl alcohol or liquid resorcinol-furfural resins is an addition agent to the series of resins known in the trade as "Resin X," which consists of acid catalyzed furfuryl-alcohol-furfural mixtures. This addition permits the "Resin X" to be catalyzed under alkaline conditions which has heretofore not been possible. The necessity of using an acid catalyst has, in some cases particularly where cellulosic materials are present, limited the applications of "Resin X," whereas by using the new liquid resins catalyzed by alkaline catalysts, and mixing these with partly polymerized acid catalyzed furfural-furfuryl alcohol mixtures ("Resin X"), it is possible to overcome these objections.

In my preferred practice, I resinify under acid catalyst conditions a suitable mixture of furfuryl alcohol and furfural to a product having a viscosity of about 100 centipoises. In general, I prefer to carry this reaction to as high viscosity liquid as can readily be mixed with the other constituent. If this resin is not used immediately, the further polymerization may be temporarily inhibited by adding a volatile basic reagent such as a tertiary amine (for examples, triethylamine, trimethylamine, triethanolamine, etc.) in an amount to give a pH above 3.5. To this resinous liquid is added a viscous (preferably 50 to 500 centipoises) furfuryl alcohol-resorcinol, or furfural-resorcinol resin, made as described above. The "Resin X" of viscosities from 10 to 2000 centipoises has been employed but the fluid product which I prefer may best be made by using the viscosities indicated. An alkali catalyst is then added, for example, 2 to 10 parts by weight of approximately twenty percent water solution of caustic soda to each 100 parts of the mixed resins. Some exothermic heat is generated, and the resin combination sets at ordinary room temperatures without the application of external heat. I may, however, use less alkaline catalyst and complete the resinification with heat.

For the alkaline catalyst I may use, besides the caustic alkali solution, any suitable inorganic or organic compound which yields a strong alkaline solution in the presence of water, and which does not otherwise adversely effect the reaction here involved, including for examples the caustic alkalies, alkali metal carbonates, ammonium hydroxide, ammonium hydrosulfide, alkyl substituted ammonium hydroxides, and alkamines. Where the terms "alkali" or "alkaline" catalyst is used in these specifications and claims, it is meant to include the specific reagents mentioned and any others equivalent thereto in the reactions herein described.

My alkali catalyzed resin may be used in liquid form before setting to a solid, as an adhesive, or it may be molded or cast into shapes, or used for paper or fabric lamination products.

Wide variations in the proportions of ingredients may be used, and eight compositions are here given for illustration. In the first six examples, the alkali catalyzed resin of resorcinol with either furfuryl alcohol, or furfural, are in equimolecular proportions, while the "Resin X" (furfural-furfuryl alcohol acid catalyzed) component, has its composition varied as indicated.

*Example I*

Parts by weight

Furfuryl alcohol-resorcinol, alkali catalyzed resin _____ 1
70% furfuryl alcohol—30% furfural acid catalyzed resin _____ 2
A 20% caustic soda solution in water _____ .25

*Example II*

Parts by weight

Furfuryl alcohol-resorcinol, alkali catalyzed resin _____ 1
60% furfuryl alcohol—30% furfural, acid catalyzed resin _____ 2.25
A 20% caustic soda solution in water _____ .35

*Example III*

Parts by weight

Furfural-resorcinol, alkali catalyzed resin ___ 10
70% furfuryl alcohol—30% furfural, acid catalyzed resin _____ 10
A 20% caustic soda solution in water _____ 1

*Example IV*

Parts by weight

Furfuryl alcohol-resorcinol, alkali catalyzed resin _____ 3
90% furfuryl alcohol—10% furfural, acid catalyzed resin _____ 10
A 20% caustic soda solution in water _____ 1.3

*Example V*

Parts by weight

Furfural-resorcinol, alkali catalyzed resin ___ 10
50% furfuryl alcohol—50% furfural, acid catalyzed resin _____ 8.7
A 20% caustic soda solution in water _____ 1

*Example VI*

Parts by weight

Furfuryl alcohol-resorcinol, alkali catalyzed resin _____ 1.5
Furfural-furfuryl alcohol, equal parts, acid catalyzed resin _____
A 20% caustic soda solution _____ .25

Example VII

| | Parts by weight |
|---|---|
| Fufuryl alcohol-resorcinol resin | 10 |
| Furfural | 7.5 |
| Triethanolamine | 2 |

The furfuraldehyde in this composition may be varied from 5 to 10 parts by weight, and the triethanolamine from 1 to 3 parts with similar results.

Example VIII

| | Parts by weight |
|---|---|
| Furfuryl alcohol-resorcinol resin | 10 |
| Furfural containing 50 percent polyvinyl acetate in solution | 10 |
| Triethanolamine | 2 |

The furfuraldehyde in this composition may be acetate, polyvinyl butyral, ethyl cellulose, and similar materials which are soluble in furfural may advantageously be dissolved in the furfural and added with it to the resorcinol-furfuryl alcohol resin, and have the effects of giving greater toughness to the resins, and otherwise modify their physical properties. The amounts so added may be varied up to equal weights of the thermoplastic addition material and the furfural.

All of these combinations are effectively polymerized under alkaline conditions, to give homogeneous, strong, solid resins. When the two components, the acid catalyzed resin and the alkali catalyzed resin are mixed together with the additional alkali catalyst, the mixture becomes warm by exothermic heat, and the resin sets up to a hard strong body without externally applied heat. The best or optimum range of properties of the finished resins appears to be the compositions having a molecular proportion of furfural in excess of resorcinol, a slight excess for the furfuryl alcohol-resorcinol liquid resin addition agent, and a large excess for the resorcinol-furfural resin addition agent.

In the table are shown some typical shear strengths. These were measured by pulling apart aluminum strips which had been cemented together under uniform conditions of curing for 48 hours at 120° F. after catalyzing the mixture of components with an alkali catalyst.

| Parts by weight of acid catalyzed Resin, 2 moles furfuryl alcohol to 1 mol furfural | Parts by weight of alkaline catalyzed Resin of the mol composition shown | Shear strength, p. s. i. |
|---|---|---|
| 2 | 1 (1½ Resor.-1 furfuryl alc.) | 350 |
| 5 | 1 (1½ Resor.-1 furfuryl alc.) | 100 |
| 1 | 1 (1½ Resor.-1 furfuryl alc.) | 175 |
| 2 | 1 (1 Resor.-1½ furfuryl alc.) | 200 |
| 5 | 1 (1 Resor.-1½ furfuryl alc.) | 75 |
| 1 | 1 (1 Resor.-1½ furfuryl alc.) | 50 |
| 2 | 1 (1 Resor.-1 furfuryl alc.) | 500 |
| 3 | 1 (1 Resor.-1 furfuryl alc.) | 100 |
| 1 | 1 (1 Resor.-1 furfuryl alc.) | 50 |
| 1.35 | 1 (1 Resor.-1 furfural) | 900 |
| 2 | 1 (1 Resor.-1 furfural) | 500 |
| 1 | 1 (1 Resor.-1 furfural) | 800 |

The compression strengths of typical cured cast samples also show similar trends as shown for shear strengths. For example, 1 part of resorcinol-furfural resin to 1.35 parts of furfural-furfuryl alcohol resin will cure at 120° F. to a compressive strength of 9000 p. s. i., while 2 parts of the "Resin X" to 1 part of resorcinol-furfural will cure to a strength of only 2000 p. s. i. under similar conditions. Under the same low temperature cure conditions, 2 parts of "Resin X" to 1 part of furfuryl alcohol-resorcinol will have a strength of 2500 p. s. i., while 1:1 and 3:1 rations of these resins will have less than 1000 p. s. i. compressive strength. All of these resins are alkali catalyzed. The addition of liquid furfural to resorcinol-furfuryl-alcohol resins yields a series of liquid low temperature curing resins which show a peak in physical characteristics around equimolar proportions, for example, a compression strength of 7000 p. s. i. However, as much as 3 moles furfural to 1 mole of the resorcinol-furfuryl alcohol resin have been combined with good results.

The "Resin X" materials modified by the addition of the furfuryl-alcohol-resorcinol resins, and alkaline catalysts, may be used as cold casting resins, or as adhesives, etc. They may be mixed with fillers and coloring materials following the usual practice of the art. Since they become solid without the application of externally applied heat, the methods used for forming into shapes, or into laminated structures, may be greatly simplified, expedited, and lowered in cost. An important application of the resorcinol-furfuryl alcohol resin with added furfural, with or without dissolved thermoplastics such as polyvinyl acetate, is for low pressure laminating. Cloths of canvas or glass fiber may be impregnated and cured at low temperatures under 200° F. in the presence of air. This is a marked advantage over the present practice of laminating which requires absence of air for other allyl-type thermosetting resins. My resin may be advantageously employed in bonding wood, because of the use of alkaline catalysts.

While I have described and illustrated my invention by specific examples, I do not wish to be limited to the specific compositions shown, but restrict my invention only insofar as required by the prior art and the spirit of the appended claims.

I claim:

1. A liquid polymer resin comprising the product resulting from heating a mixture of resorcinol and furfuryl alcohol in proportions ranging from 1 mole resorcinol for each two moles of furfuryl alcohol, to three moles resorcinol for each one male of furfuryl alcohol, in the presence of an alkali catalyst in an amount to give a pH of at least 8.0.

2. A liquid polymer resin comprising the product resulting from heating a mixture of resorcinol and furfuryl alcohol in equal mole proportions, in the presence of an alkali catalyst in an amount to give a pH of at least 8.0.

3. A resinous material consisting of the product resulting from reacting in the presence of an alkali catalyst a mixture consisting of (a) the product resulting from condensing and polymerizing a mixture of furfuryl alcohol and furfural, and (b) a liquid resin comprising the product resulting from heating a mixture of resorcinol and furfuryl alcohol in the presence of an alkali catalyst in an amount to give a pH of at least 8.0 the proportion of the resorcinol to furfuryl alcohol being in the range from 1:2 to 3:1 mol weights of said ingredients.

4. A resinous material consisting of the product resulting from reacting in the presence of an alkali catalyst a mixture consisting of (a) the liquid product resulting from condensing and polymerizing a mixture of two moles of furfuryl alcohol and one mole of furfural, and of (b) a liquid resin comprising the product resulting from heating furfuryl alcohol and resorcinol in equal molecular proportions in the presence of an alkali catalyst in an amount to give a pH of at least 8.0.

5. A thermosetting resin comprising the product resulting from reacting in the presence of an alkali catalyst a mixture consisting of (a) furfural in which is dissolved a furfural-soluble thermoplastic polymer resin, and (b) a resin resulting from heating a mixture of furfuryl alcohol and resorcinol in the presence of an alkali catalyst in an amount to give a pH of at least 8.0 the proportions of furfuryl alcohol to resorcinol being in the range from 2:1 to 1:3 mol weights of the ingredients.

JOHN DELMONTE.

REFERENCES CITED

The following references are of record in the file of this patent:

UNITED STATES PATENTS

| Number | Name | Date |
| --- | --- | --- |
| 1,737,121 | Novotny | Nov. 26, 1929 |
| 1,802,390 | Novotny | Apr. 28, 1931 |
| 2,128,229 | Charch | Aug. 30, 1938 |
| 2,321,493 | Korten | June 8, 1943 |
| 2,343,972 | Harvey | Mar. 14, 1944 |
| 2,367,312 | Reineck | Jan. 16, 1945 |